United States Patent
Koehler et al.

(10) Patent No.: US 9,167,612 B2
(45) Date of Patent: Oct. 20, 2015

(54) MINIMAL SYNCHRONIZED NETWORK OPERATIONS

(75) Inventors: Yannick Koehler, Lasalle (CA); Jocelyn Le Sage, St-Colomban (CA); Stephane Laroche, Montreal (CA)

(73) Assignee: Hewlett-Packard Development Company, L.P., Houston, TX (US)

( * ) Notice: Subject to any disclaimer, the term of this patent is extended or adjusted under 35 U.S.C. 154(b) by 1058 days.

(21) Appl. No.: 13/082,130

(22) Filed: Apr. 7, 2011

(65) Prior Publication Data

US 2012/0259992 A1    Oct. 11, 2012

(51) Int. Cl.
*H04W 4/00* (2009.01)
*H04W 76/02* (2009.01)
*H04W 12/06* (2009.01)
*H04W 88/12* (2009.01)

(52) U.S. Cl.
CPC ............. *H04W 76/022* (2013.01); *H04W 12/06* (2013.01); *H04W 76/025* (2013.01); *H04W 88/12* (2013.01)

(58) Field of Classification Search
None
See application file for complete search history.

(56) References Cited

U.S. PATENT DOCUMENTS

| | | | |
|---|---|---|---|
| 6,888,803 B1 * | 5/2005 | Gentry et al. | 370/259 |
| 7,142,650 B1 * | 11/2006 | Kult et al. | 379/112.01 |
| 7,321,577 B2 | 1/2008 | Shimizu et al. | |
| 7,486,621 B2 | 2/2009 | Bessis et al. | |
| 7,864,665 B2 | 1/2011 | Shei et al. | |
| 7,881,208 B1 | 2/2011 | Nosella et al. | |
| 2004/0214576 A1 * | 10/2004 | Myers et al. | 455/445 |
| 2006/0099929 A1 * | 5/2006 | Frank et al. | 455/411 |
| 2006/0171298 A1 | 8/2006 | Vu | |
| 2007/0153685 A1 * | 7/2007 | Moon et al. | 370/229 |
| 2007/0153741 A1 * | 7/2007 | Blanchette et al. | 370/331 |
| 2010/0061232 A1 | 3/2010 | Zhou et al. | |
| 2010/0067486 A1 * | 3/2010 | Masuda | 370/331 |

* cited by examiner

*Primary Examiner* — Kibrom T Hailu
(74) *Attorney, Agent, or Firm* — Van Cott, Bagley, Cornwall & McCarthy

(57) ABSTRACT

A method for minimal synchronized network operations includes making an initial connection between a client and a network, the initial connection being made through a first access point managed by a home controller, the home controller recording session information and authentication data for the client. A subsequent connection is made between the client and the network through a second access point managed by a second controller, the subsequent connection being made communicating the session information and authentication data between the home controller and the second controller, without client reauthentication, and without disrupting existing communication.

20 Claims, 8 Drawing Sheets

400

Client/Controller Association Table

| Client MAC | Access Point MAC | Home Controller MAC | Additional Data |
|---|---|---|---|
| 00:b0:d0:86:bb:f7 | 01:00:5e:7f:ff:fa | 00:1f:3b:d2:5e:6b | |
| | | | |
| | | | |

Heartbeat Table

| Controller MAC | Status | Next Interval to Poll |
|---|---|---|
| 00:1f:3b:d2:5e:6b | UP | 00:00:24 |
| 00:17:a4:05:de:da | UP | 00:00:08 |
| | | |

Team Member Table

| Controller IP Address | Controller MAC | Management IP Address |
|---|---|---|
| 192.168.1.1 | 00:1f:3b:d2:5e:6b | 10.0.0.1 |
| 192.168.1.2 | 00:17:a4:05:de:da | 10.0.0.2 |
| | | |
| | | |

| User Authentication Table | | | |
|---|---|---|---|
| User ID | User Name | User IP Address | Station ID |
| XXXX | XXXXXXX | 192.168.1.20 | XXXXXX |
| | | | |
| | | | |

| Station Table | | |
|---|---|---|
| Station ID | Station MAC | Features |
| XXXXXX | 02:00:5e:7f:ff:fa | |
| | | |
| | | |

| Bridge Association Table | | |
|---|---|---|
| Client MAC | Port (VLAN) | Idle Time |
| 00:b0:d0:86:bb:f7 | XXXX | 00:00.02 |
| | | |

Fig. 4F

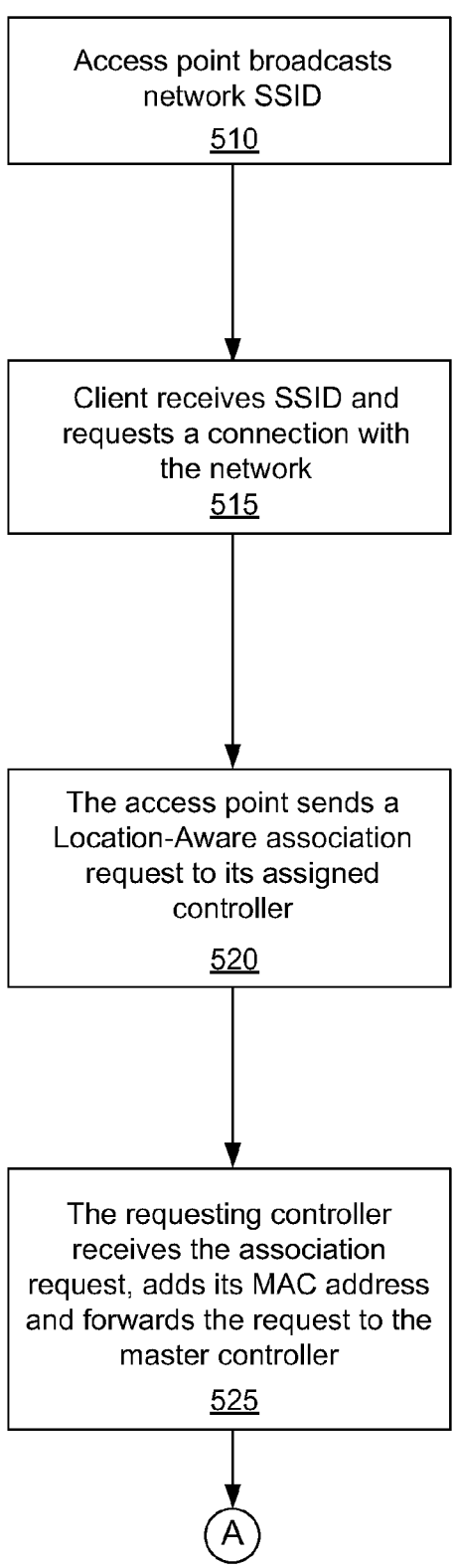
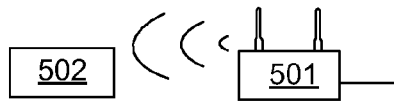
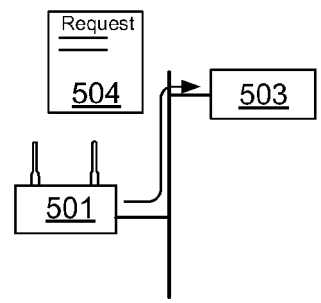
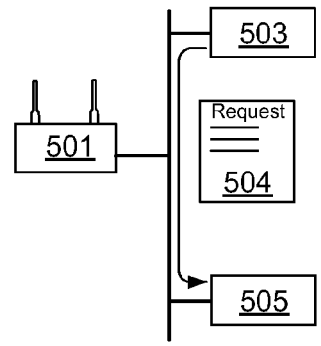
*Fig. 5A*  *Fig. 5B*

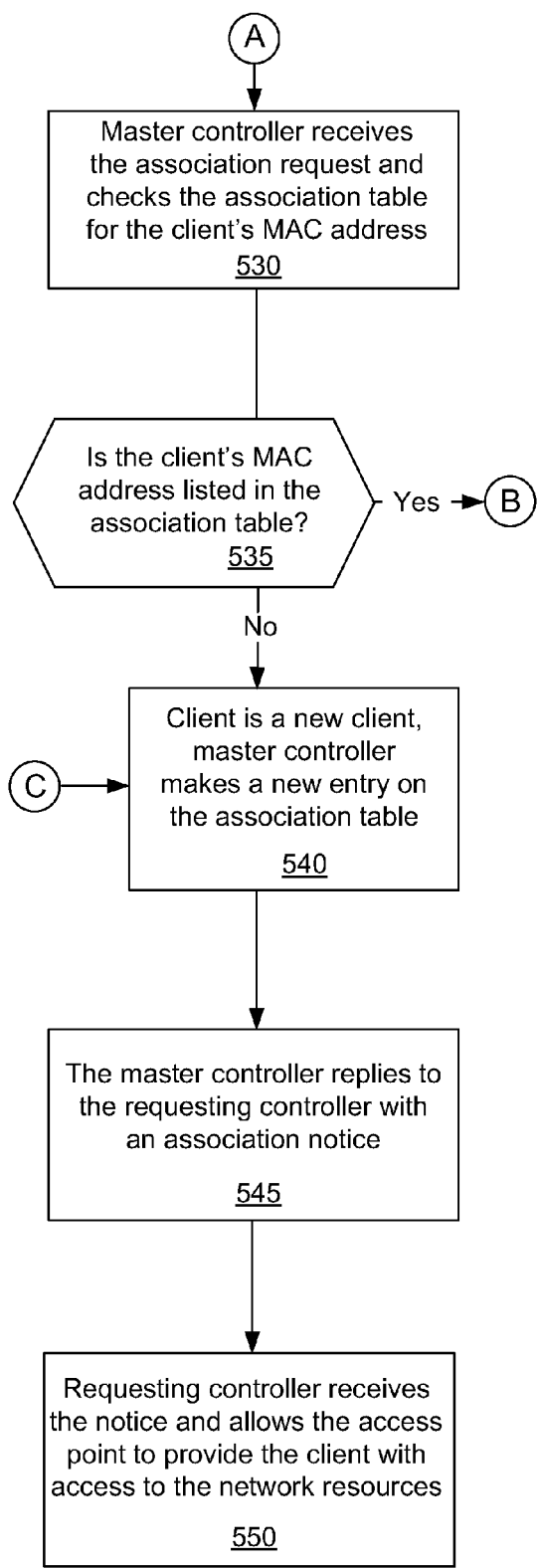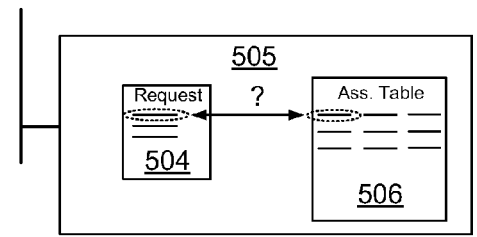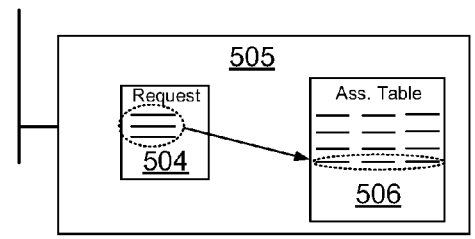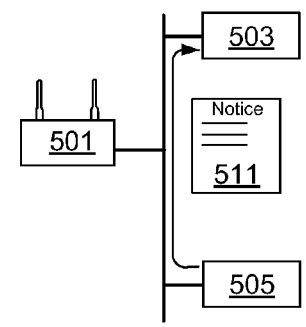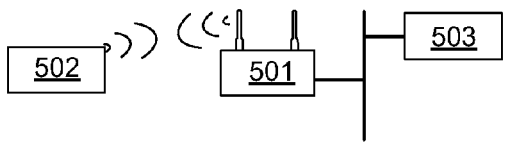
*Fig. 5A (cont.)*     *Fig. 5B (cont.)*

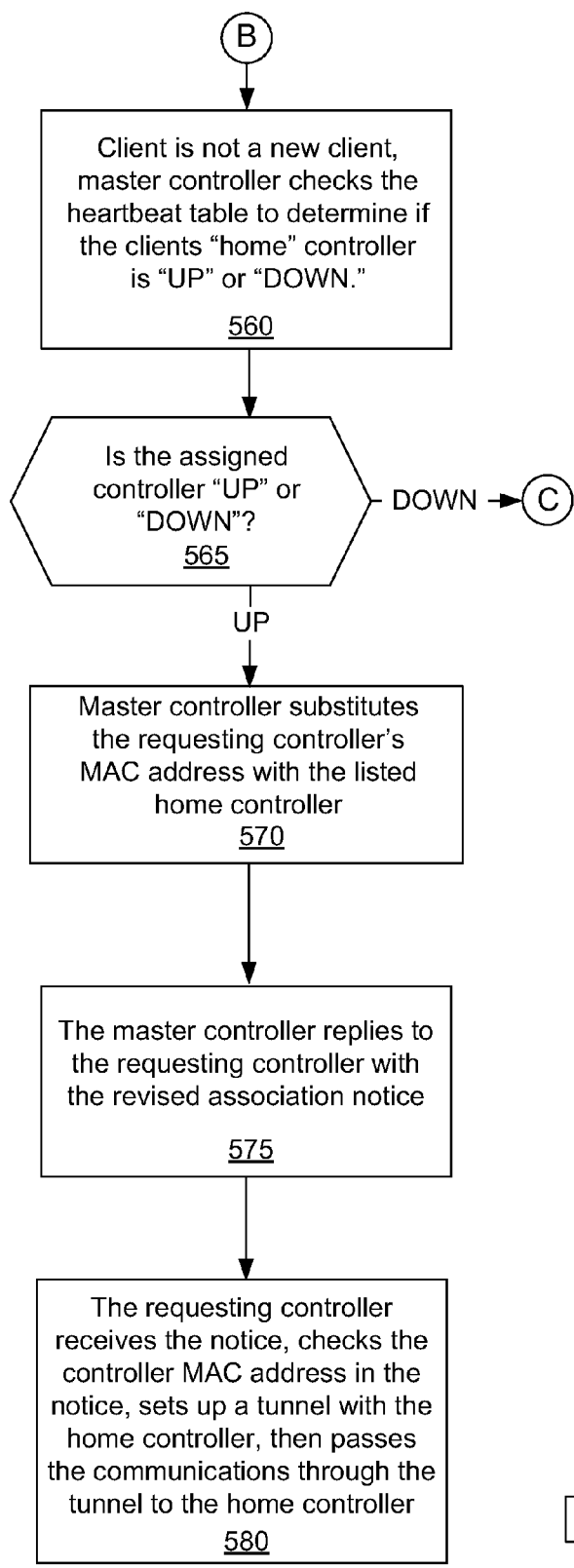
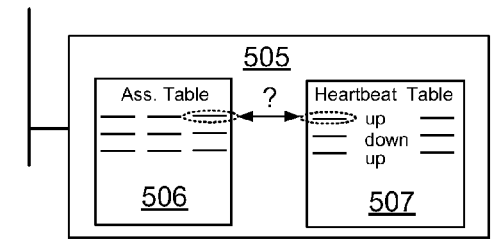
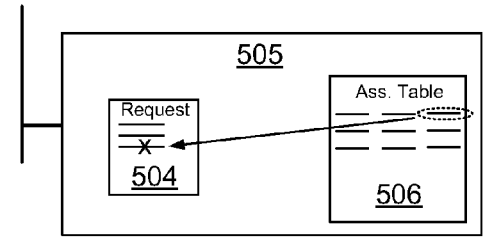
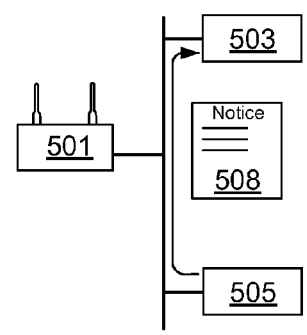
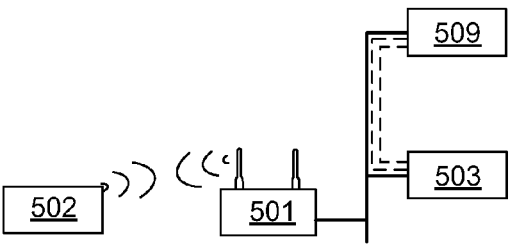
*Fig. 5A (cont.)*  *Fig. 5B (cont.)*

MINIMAL SYNCHRONIZED NETWORK OPERATIONS

BACKGROUND

Wireless networks are becoming increasingly popular architectures that provide connectivity between computing devices and networks. Wireless networks allow client computing devices to maintain connectivity while moving from location to location within the network area. Wireless access points are distributed through the network area to maintain wireless connectivity with the client devices. The wireless access points typically include radio transmitters and a wired network connection. The wireless access points act as transfer points between the wired and wireless signal, and vice versa. The radios in the wireless access points communicate with radios in the client device. The wireless access points pass the data received from the client device through a wired connection into the network. The wireless access points may also forward traffic to other networks using radios. Access controllers support and configure the wireless access points to form a cohesive and robust network. For example, access controllers may be used for authentication, encryption, Virtual Local Area Network (VLAN) support, and security functions.

BRIEF DESCRIPTION OF THE DRAWINGS

The accompanying drawings illustrate various examples of the principles described herein and are a part of the specification. The illustrated examples are merely examples and do not limit the scope of the claims.

FIGS. 4A-4F are illustrative data structures maintained by the access controllers, according to one example of principles described herein.

FIGS. 5A and 5B describe illustrative operations of a network system using minimally synchronized methods, according to one example of principles described herein.

Throughout the drawings, identical reference numbers designate similar, but not necessarily identical, elements.

DETAILED DESCRIPTION

As discussed above, access controllers support and configure the wireless access points to form a cohesive and robust network. Access controllers can typically control a number of wireless access points and accommodate a large number of client computing devices. For example, the HP E-MSM760 Access Controller can control hundreds of wireless access points and accommodate thousands of clients. However, some networks may include multiple access controllers for expanded capacity, higher throughput, greater configuration flexibility, redundancy or more distributed operations. Coordination between the access controllers allows users to roam between access points managed by different access controllers without interruption of service. Coordination between the access controllers can also be used to maintain client security and network integrity. However, complete synchronization between access controllers can be burdensome both in terms of configuring the access controllers and in communication between the access controllers.

Illustrative systems and methods for minimally synchronized access controller interaction are described below. In one example, the minimally synchronized interaction between the access controllers takes the form of a master-slave relationship with communication between the controllers passing through secure L2 tunnels. As used in the specification and appended claims, the term "minimally synchronized," refers to access controllers in a network that do not maintain uniform data with respect to access points, users, session data, and/or authentication. For example, in a master-slave relationship the master access controller may maintain data that relates to the entire wireless network, while slave access controllers may maintain more limited amounts of data related to the session data and authentication of clients. This minimally synchronized interaction allows for unified control over the wireless access points and user connections but does not include complex near real-time communication of the complete network state between all the access controllers.

In the following description, for purposes of explanation, numerous specific details are set forth in order to provide a thorough understanding of the present systems and methods. It will be apparent, however, to one skilled in the art that the present apparatus, systems and methods may be practiced without these specific details. Reference in the specification to "an example" or similar language means that a particular feature, structure, or characteristic described in connection with the example is included in at least that one example, but not necessarily in other examples.

Figure 1:
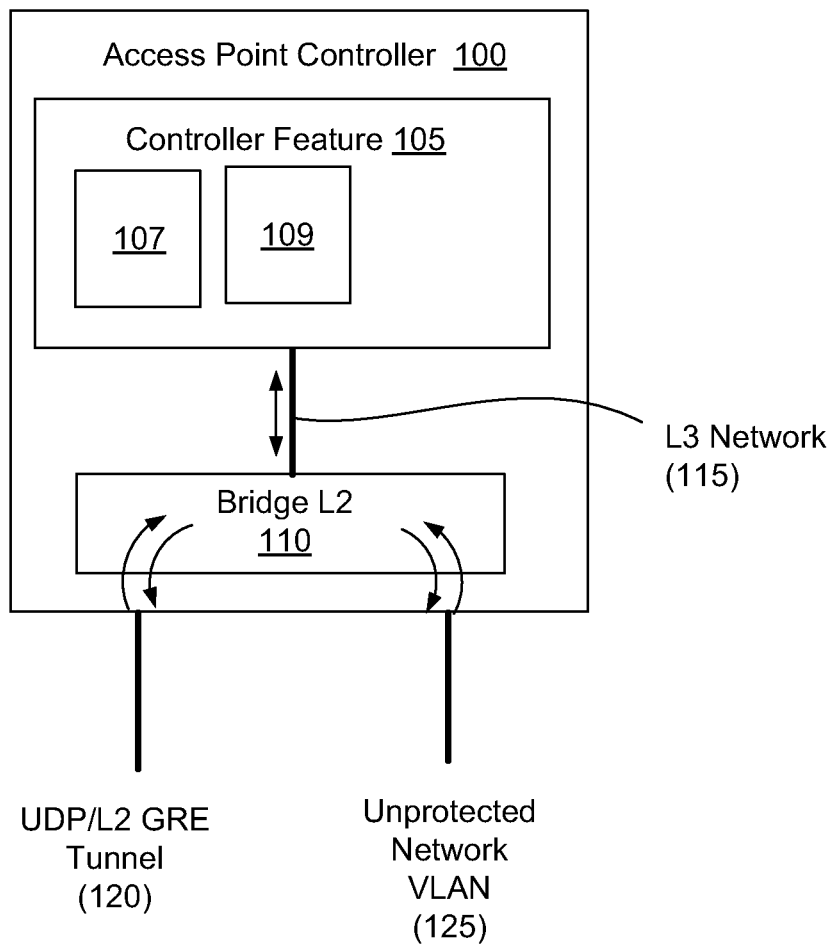
FIG. 1 is a diagram of an illustrative access controller, according to one example of principles described herein.

FIG. 1 is a diagram of an illustrative access point controller (100) that includes a controller feature (105), an L3 network (115) and a bridge (110). The access point controller (100) may support a number of different external connections with various networks. In this example, a User Datagram Protocol/Level 2 Generic Routing Encapsulation (UDP/L2 GRE) tunnel (120) is used to make secure connections to other network devices. An unprotected network VLAN connection (125) is used to accept data from the access points.

The bridge (110) connects the incoming network traffic at the data link layer (Layer 2) and translates the traffic between the controller feature (105) and the external connections. The access point controller (100) utilizes a Level 3 protocol network for communication between the controller feature (105) and the bridge (110). The controller feature (105) includes a memory (107) and a processor (109). The memory (107) can be used to store data in a variety of forms, including the data structures described below. The processor (109) accesses the memory to retrieve instructions and to analyze/modify the data structures.

The access point controller (100) described above is an illustrative example and is not intended to be limiting. Access point controllers (100) may have a variety of configurations. For example, the access point controller (100) may be a standalone physical unit or may be implemented as part of a larger physical system. In one implementation, the function of the controller feature (105) is not dependent on the route the traffic follows to reach it. The controller feature (105) treats traffic from the tunnel (120) and traffic from the unprotected network (125) in the same way. Although the access point controller (100) is illustrated as having two wired connections (120, 125), the access point controller (105) may have one, two, three or more wired connections. Additionally, where an L2 tunnels are described in the specification or appended claims, specific examples of L2 tunnel configurations may be given. However, L2 tunnels refer to a tunnel encapsulating communication packets, including the Layer 2 information. L2 tunnels are not restricted to L2 networks.

Figure 2:
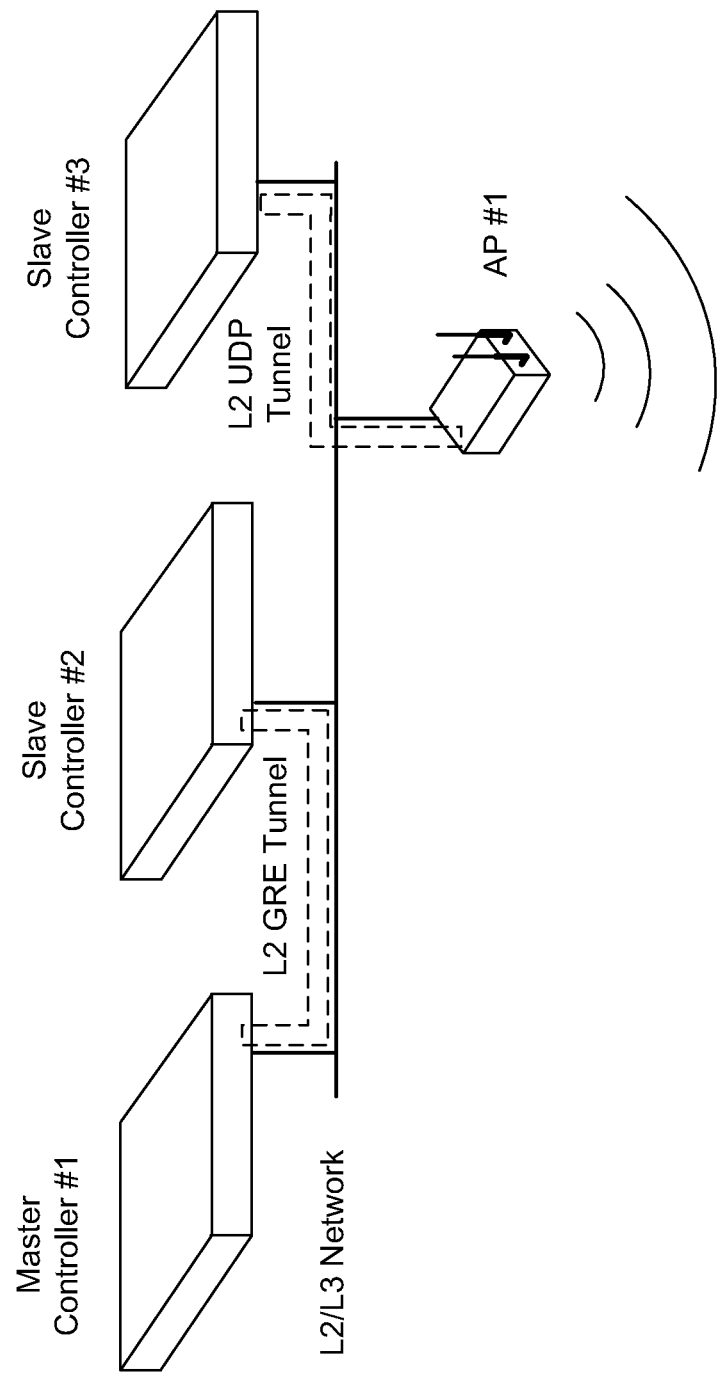
FIG. 2 is a diagram of illustrative access controllers connected through a network to each other and a wireless access point, according to one example of principles described herein.

FIG. 2 is a system diagram of multiple controllers connected to a control network. In this example, the control network is a L2/L3 network that allows for the secure transmission of control information between the various components attached to the network.

The three controllers are configured in a master-slave hierarchy with the left controller serving as the master controller and the other controllers as the slave controllers. In this example, communication between the master and slave controllers occurs through a Layer 2 Generic Routing Encapsulation (L2 GRE) tunnel. The GRE tunneling protocol encapsulates a wide variety of network layer protocols over an internet protocol network.

A number of access points (AP) are also connected to the network. As discussed above, each controller has the capacity to control hundreds of access points. However, for purposes of illustration only one access point is shown. In the illustrative minimally synchronized networks described herein, each access point is controlled by only one controller.

In this example, control communication between the access point and its designated controller occurs over a L2 User Datagram Protocol (L2 UDP) tunnel. The L2 UDP tunnel connects a specific controller to a number of access points. The user datagram protocol is a simple stateless transmission model that is compatible with packet broadcasting and multicasting. The low overhead of the L2 UDP tunnel allows the controllers to efficiently communicate with large numbers of access points.

Figure 3:
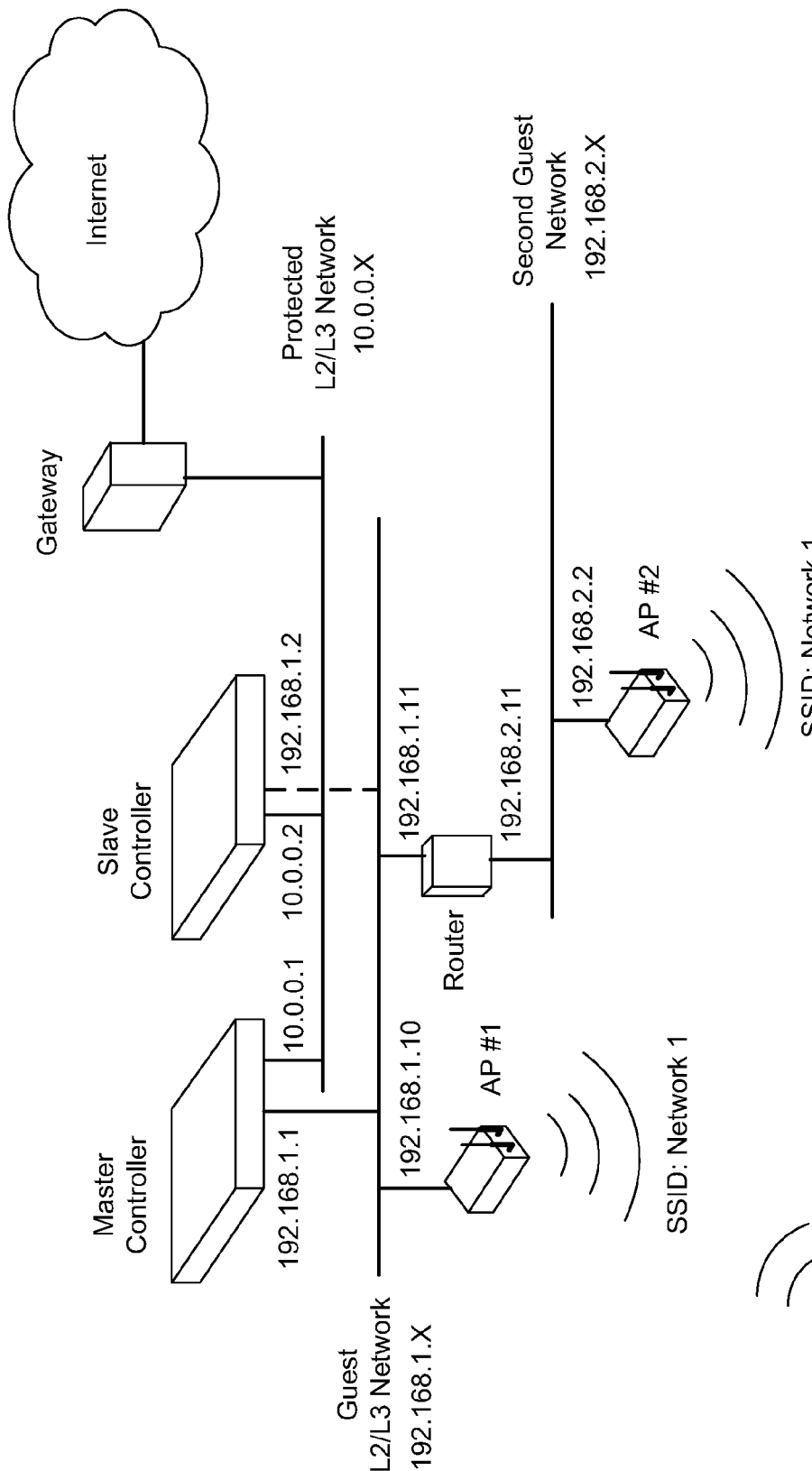
FIG. 3 is a diagram of an illustrative minimally synchronized network, according to one example of principles described herein.

FIG. 3 is a diagram of an illustrative network system that includes three interconnected networks and various elements connected to the networks. For purposes of describing the operative principles of non-synchronous coordination between controllers, the network system has been simplified and the number of components reduced. In this example, the purpose of the network system is to connect wireless clients to the internet or other network. A protected L2/L3 network has an internet protocol (IP) address of 10.0.0.X. This protected L2/L3 network is used for communication between the controllers and the gateway to reach additional networks. The IP address of the connection of the master controller to the protected network is 10.0.0.1 and the IP address of the connection of the slave controller to the protected network is 10.0.0.2. In this example, the gateway acts as an entrance to the internet or other network. The gateway interfaces with the internet by using protocol translators, rate converters, and other mechanisms to provide interoperability between the network system and the internet.

A first guest L2/L3 network has an IP address of 192.168.1.X. The first guest network connects to the controllers, access point #1 (AP #1) and a router that connects to the second guest network. All connections with the first guest network have IP addresses with the form 192.168.1.X. For example, the connections to the master controller, slave controller, access point #1 (AP#1) and router are 192.168.1.1, 192.168.1.2, 192.168.1.10, 192.168.1.11, respectively. As discussed above, the guest networks can be used to create L2 GRE tunnels between the controllers. A router forms a communication link between the two guest networks.

The second guest network has an IP address of 192.168.2.X. The connection to the router has an IP address of 192.168.2.11 and the connection to the access point 2 (AP#2) has an IP address of 192.168.2.2. In this implementation, each access point is managed by one and only one controller. For example, access point 1 may be managed by the master controller and access point 2 may be managed by the slave controller. The controllers organize the access points to create a wireless network with a Service Set IDentifier (SSID) of Network 1. A mobile device is the client and connects to the wireless Network 1. The client has an IP address of 192.168.1.20, a Domain Name System (DNS) of 192.168.1.1, and a gateway of 192.168.1.1. In this example, the client is wirelessly connected to access point 1 that is managed by the master controller. The master controller records the user's authentication information, manages session parameters, controls the user's access, and routes requests and data to/from the gateway.

As discussed above, coordination between the controllers can be used to create a seamless communication experience for the client. For example, if the user moves the client device from a location where access point #2 is accessible to a location where only access point #1 is available, it is desirable for the transition between the two access points to be as seamless as possible. However, because only one controller manages a given access point, the client may also be switching between controllers. In this example, the client device is switching from the master controller to the slave controller. In some examples, if there is no mechanism for the master controller to obtain information from slave controller, the client's session is disrupted, data transmissions are terminated, and the client has to log into the network again through the slave controller. One potential method for coordination between controllers is to synchronize the data contained on the controllers in near real time. In this way, each of the controllers has all the available data and a situational awareness that spans the entire network system. However, this real time exchange of data between the controllers can be complex and cumbersome. For this level of synchronization, each controller contributes to the data and listens to every other controller. This can generate a large amount of network data. Additionally, each controller makes real time decisions about updating and discarding information. Consequently, synchronized coordination can be difficult to implement and cumbersome to maintain.

According to one illustrative implementation, minimally synchronized coordination between the controllers can be used. Within a minimally synchronized system, the controllers do not have the same data or equal access to data. Instead, one controller is designated as a master controller and the other controllers are slave controllers. This can eliminate the amount of session data and authentication data that is transmitted between controllers and significantly simplifies the operation of the network.

FIGS. 4A-4F show six illustrative data tables that can be used as structures for storing, organizing, and sharing selected data within a minimally synchronized network. A first data table is an illustrative client/controller association table (400) shown in FIG. 4A. In this example, the association table (400) contains at least three data entries for each client that is connected to the network: the client Media Access Control (MAC) address, the access point MAC address, and a home controller MAC address. The association table is maintained and held in the master controller and periodically replicated to the slave controllers. The association table may also be used to record additional information such as the network SSID, radio information, and VLAN information.

Initially there are no clients connected to the network and the association table is empty. When a client attempts to connect to the network, a client identifier and an access point identifier can be recorded in the table. These identifiers may have a variety of forms including MAC addresses, IP addresses, or other identifiers. In this example, the client's MAC address and the MAC address of the access point the client is using are recorded. As described below, the master controller can assign a specific controller to manage the client session. This controller is called the client's "home" controller. As long as the client is connected to any access point within the network, the home controller for the client remains the same. To reset the association between a client and a controller, the client leaves the network and the connection times out. For example, it may take two minutes after the client stops communicating with the network for the client to time-out of an access point. Additional time may elapse for the client to time-out of the controller. A variety of other mechanisms, such as error conditions and administrative actions can also cause the client's connection to be terminated. After the client's connection is terminated, the client's information can be deleted from the association table. If the client reconnects to the network, the client reauthenticates and is reassigned a home controller.

FIG. 4B is an illustrative heartbeat table (405). The heartbeat table (405) is held by the master controller and not replicated to the slave controllers. The master controller periodically sends out a heartbeat message to the slave controllers and waits for a response.

Using the heartbeat, the heartbeat table (405) monitors the health of the slave controllers. The first column of the heartbeat table (405) lists the MAC address of the slave controllers. The second column lists the health status of each slave controller. The status may be recorded in a number of ways. For example, the status may be an indication of whether the slave controller is "Up" or "Down." The third column of the heartbeat table lists the time until the next poll is taken for each slave controller. For example, the master controller may poll the slave controllers every 30 seconds. If the master controller detects that one of the slave controllers is not operational because the slave controller did not return the heartbeat, the master controller changes the controller status to "Down" and may take appropriate action to reassign access points and clients to functioning controllers. Additionally, the slave controllers expect this periodic heartbeat and maintain a "master controller status" using the periodic heartbeat as an indicator that the master controller is operational. If the slave controllers to do not receive the heartbeat for a predetermined time, they trigger an election of a new master controller.

FIG. 4C is an illustrative team member table (410). In this example, the team member table (410) identifies the active controllers within the system by IP address, MAC number and management IP address. The controller IP address is the network connection between the controller and its access points over the unprotected network. The controller MAC address positively identifies the controller hardware. The management IP address is the network connection of the secure network with the controllers. Management messages such as heartbeat messages and association table updates are communicated through to this address. The team member table (410) is maintained by all controllers.

FIGS. 4D-4F are tables that contain session and authentication data for each client. These tables are held by each of the controllers for the clients that are assigned to them and not shared between controllers. FIG. 4D is an illustrative example of a user authentication table (415). In this example, the authentication table (415) includes the user ID, the user name, and the user IP address, and the station ID. A variety of additional information could be stored in the user authentication table, including authentication information that includes failure or success in authentication, time out information, access permissions, or other information.

Each individual controller maintains a separate and unique authentication table (415). The authentication tables (415) inside the various controllers are not shared with other controllers. The authentication table (415) has one entry for each client that is authenticated on the network and uses the controller as the client's home controller. There may be a maximum limit to the number of authenticated users that can be accommodated by the controller. For example, an HP E-MSM760 controller can support up to 2,000 authenticated users at one time. Consequently, for this controller the maximum number of entries in the authentication table will be 2,000.

FIG. 4E is an illustrative example of a station table (420). In this example, the station table (420) includes the station ID and the station MAC address. Each controller maintains its own station table (420) and does not distribute it. The station table (420) may include a number of additional entries. In this example, the station table (420) includes column listing control features.

The station table (420) has one entry for each unauthenticated client who uses the controller as the client's home controller. There may be a maximum limit to the number of unauthenticated users that can be accommodated by the controller. For example, an HP E-MSM760 controller can support up to 10,000 unauthenticated users at one time. Consequently, for this controller the maximum number of entries in the station table (420) in this example will be 10,000.

FIG. 4F is an illustrative example of a bridge association table (425). In this example, the bridge association table (425) includes the client MAC address, the port number that the client is connecting through, and an idle time counter. The idle time counter measures the length of time without activity by the client. After a predetermined period of time without activity, the client is disconnected from the network. The bridge association table (425) is also maintained by the individual controllers and is not distributed. An equivalent association table for the wireless radio may also be used that includes: the radio MAC address, the radio ID, the radio SSID, the time of association, allowable idle time, and other entries. In one implementation, the wireless association table may have an idle time out of 2-3 minutes while the bridge table may have an idle time out of 5 minutes. Both of these values can be reconfigured by an administrator.

The tables described above are illustrative examples. The data contained in the tables may be organized, stored, and retrieved using a variety of data structures. In some examples, the data can be organized so that there are fewer or more tables. For example, an additional table may be a client association table that contains: the client MAC address, the access point MAC address, the access point SSID, an access point radio identifier, a VLAN identifier and an interface name.

FIGS. 5A and 5B describe illustrative operations of the network system using minimally synchronized methods. FIG. 5A is a flow chart showing various blocks of the method. FIG. 5A continues across three sequential drawing sheets. FIG. 5B contains diagrams of system components, network connections, and data structures that are associated with the adjacent blocks on the left. FIG. 5B continues across the same three sequential drawing sheets.

FIGS. 5A and 5B illustrate methods for minimally synchronized network operations that include making an initial connection between a client and a network and assigning a home controller to the client. The client accesses the network through an access point managed by the home controller. The home controller records session information and authentication data for the client. When the client makes a subsequent connection with the network a second access point managed by a second controller, the subsequent connection can be made without communicating the session information and authentication data between the home controller and the second controller and without client reauthentication. This process is described in more detail below.

In one example, the access point (501) broadcasts the network SSID to advertise that a wireless network is available (block 510). The client (502) receives the SSID and requests a connection with the network (block 515). The wireless access point (501) then sends a Location-Aware association request (504) to its assigned controller (503) (block 520). The Location-Aware association request (504) may include client and access point identifying information such as the client MAC address and the access point MAC address. At this point, the user traffic is blocked at the radio level for any wireless data packet. The controller (503) receives the association request (504), adds its MAC address to the association request (504), and sends it to the master controller (505) (block 525).

Continuing through point A, the master controller (505) receives the association request (504) and checks the association table (506) for the client MAC address (block 530). A decision is made based on whether the client's MAC address is listed on the association table (determination 535). If the client MAC address is listed on the association table (506), the client is an existing client with an assigned home controller. The flowchart shows the blocks for addressing connection requests of existing clients beginning at point B on the following drawing sheet.

If the client's MAC address is not in the association table (506), the client is a new client. A new entry on the association table (506) is made with the client MAC address, the access point MAC address and a home controller MAC address (block 540). This entry of the home controller MAC address onto the table (506) designates this controller as the home controller of the client. As discussed above, the home controller assignment is permanent for the duration that the client (502) is connected to the network. In some examples, the master controller (505) may assign the requesting controller (503) as the home controller for the client (502). In other examples, the master controller (505) performs a load balancing evaluation to provide faster connection speeds for the client (502). For example, the master controller (505) may estimate the response times of available controllers to requests from the client and assign the controller with the shortest response time as the home controller for the client. In other examples, this estimation may include a number of other factors including total traffic flow through the various controllers, response times of controllers to heartbeat queries, or other suitable measurements. For example, if the client is a new client, the number of clients assigned to each available controller can be assessed. The controller with the least number of clients is then assigned as the home controller for the new client and the new client is allowed to make a connection through the access point and the newly assigned home controller to the network. In this illustrative implementation, the load balancing operation is an operation that is performed only when a new client is joining the network.

After assigning a home controller, the master controller (505) replies to the requesting controller (503) with an association notice (511) (block 545). The requesting controller (503) receives the reply association notice (511) and compares the controller MAC in the notice with its own MAC address. If the controller MAC in the notice (511) matches the requesting controller's MAC address, the requesting controller (503) knows that it has been assigned as the home controller for this client. The requesting controller (503) makes the appropriate entries on its authentication table (415, FIG. 4D), the station table (420, FIG. 4E) and the bridge association table (425, FIG. 4F). The requesting controller (503) then instructs the access point (501) to unblock traffic and provides the client (502) access to the network resources (block 550). For example, the controller sets up its internal data so that the client traffic received from the access point will be forwarded to through the proper L2GRE tunnel to the assigned home controller. The user is provided access to the network resources when the access point receives the association notice and unblocks the user's communications.

The home controller may also implement a number of safety measures. For example, the controller may scan its authentication table, station table, and client/controller authentication table to determine if an entry matches the association but lists a home controller which isn't itself. If this occurs, the home controller clears the entries representing this user. This protects against leaking data when a user's home controller is modified for some reason, such as a crash of the master controller.

The client (502) can then access the network resources through the access point (501) and the access point's assigned controller (503). As discussed above, as long as the client (502) is present anywhere in the network, its home controller manages its requests and data flow. The home controller maintains data related to the connection, authentication of the client, and other information. This information can be stored in the authentication table (415, FIG. 4D), the station table (420, FIG. 4E) and the bridge association table (425, FIG. 4F). The client (502) may be a mobile device that physically moves between areas served by different access points. In one implementation, each of the access points is managed by a specific controller. Consequently, if the client (502) moves from an access point managed by its home controller to an access point managed by a second controller, the second controller does not have the client's information stored in its authentication table, station table or bridge association table. As discussed above, one potential solution to this issue is to synchronize data continued in the authentication, station, and bridge association tables between all of the controllers. However, this is can be cumbersome, significantly increase data traffic, and complicate coordination efforts between the controllers. Another option is to treat a client who has moved between access points managed by different controllers as a new client. However, this can involve breaking the data flow to the client, discarding the client's current requests, and forcing the client to reauthenticate on the new controller.

According to one illustrative example, the network system described herein provides a minimally synchronized solution that allows clients to freely roam the area served by the network but includes neither reauthentication nor synchronization of session and authentication data across the controllers. In this implementation, the data path of a client who moves between access points controlled by different controllers is transparently forwarded to the home controller. This allows the client's session information and authentication to be stored on only the home controller while providing unimpeded connections to the client throughout the area served by the network.

Blocks 511 through 550 describe an illustrative method for creating the initial connection between a client and the network and assigning a home controller to the client. The home controller assignments are created by the master controller on an association table and communicated to the controllers through an association notice. When the client moves away from access points controlled by their home controller, the client can request access to the network through an access point that is managed by a different controller. This follows the process described in blocks 511 through 535. However, in block 535, the master controller determines that the client MAC address is already listed in the association table and a home controller has already been assigned to the client. Continuing through point B in the flowchart, the master controller (505) determines that the client is not a new client and checks the heartbeat table (405, FIG. 4B) to determine if the assigned home controller is operational (block 560). This is a precautionary step which prevents the master controller (505) from referring the client to a home controller that is not functional.

In the unlikely event that the client's "home" controller is "DOWN" (i.e. not functional), the master controller treats the client's request for a connection to the network as a new request. The method continues through point C and returns to block 540 where a new home controller is assigned to the client. The client reauthenticates with the new home controller and is given access to the network. This scenario is unlikely to happen on a regular basis because the controllers have a high level of reliability. Consequently, the inconvenience of reauthentication and dropping the client's current connections will be infrequent.

If the client's home controller is "UP," the master controller substitutes the requesting controller's MAC address (i.e. the MAC address of the controller assigned to the access point through that the client is requesting access) with the MAC address of the client's home controller. This data is sent back to the requesting controller (503) as a revised association notice (508) (block 575). The controller MAC address in the association notice (508) does not match the MAC address of the requesting controller (503) so the requesting controller (503) sets up a L2 GRE tunnel with the home controller (509) that matches the MAC address in the reply association notice (508). Information to set up the tunnel is contained in the team member table (410, FIG. 4C). The requesting controller (503) then passes communications from/to the client (502) through the tunnel to the client's home controller (509).

The illustrative method described above is only one illustrative example. A number of modifications to the method could be made. For example, when the master controller is assigning a home controller to a new client, the master controller may use a number of load balancing factors to determine which controller to assign. The master controller may examine the time for various controllers to respond to a request or may consider the total traffic flow through the controllers. Further, the master controller may select a home controller for the client by estimating which controller would provide the client with the best service.

In one implementation, the access point controllers can be substantially identical. Each of the access point controllers includes a wired connection port for connecting the access point controllers to the network, a memory for storing data structures and a processor for accessing the data stored in the memory. One of the access point controllers is elected or otherwise designated as the master controller. The master controller stores the association table or other data structure in its memory. The master controller receives association requests from clients and stores them in the memory. The processor in the master controller searches the association table to determine if the client is a new or existing client. If the client is a new client, the master controller enters a client identifier and a controller identifier in the association table and makes a home controller assignment for the new client. Prior to making the home controller assignment the master controller may access a heartbeat table to determine if the home controller is operational. The master controller then generates an association notice that includes instructions for the client's network communication to be forwarded through the home controller. If the master controller has a malfunction or is otherwise taken offline, a new master controller can be designated from among the remaining controllers. The new master controller rebuilds the association table and takes over the functions of the old master controller.

Similar processes to those described above in FIGS. 5A and 5B can be used for disassociation notices. However, in a disassociation situation, the wireless association table and the controller association are cleared of the user's data, but the client/controller table and bridge association table are not modified.

As discussed above, a client typically has only one gateway/Domain Name Service (DNS). Normally that is the home controller. The home controller can be any controller within the master/slave controller group. However, in some instances, the controllers check incoming data in the UDP tunnel traffic to determine if the destination MAC address matches any controller within the master/slave controller group. If it does, the controller will attempt to process the data as if it were targeted to itself rather than ignoring it. This process is described below.

For purposes of description, a network includes:
Controller 1 ((L2) Ethernet MAC A, (L3) IP address A);
Controller 2 ((L2) Ethernet MAC B, (L3) IP address B);
Access Point 1 ((L2) Ethernet MAC C, (L3) IP address C);
Access Point 2 ((L2) Ethernet MAC D, (L3) IP address D); and
Client 1 ((L2) Ethernet MAC, (L3) IP address C).

Client 1 has IP A as its gateway, assigned to it either statically through manual configuration or through the use of Dynamic Host Configuration Protocol (DHCP). The IP A is associated to Ethernet MAC A for L2 communication. Thus, the gateway for Client 1 is IP A/MAC A. These two values are owned by one of the Ethernet ports on Controller 1. Controller 2 learns that Controller 1 has MAC A and IP A from the team member table that is synchronized between the controllers as described above. The same way, Controller 1 learns that Controller 2 has MAC B and IP B.

In this example, Access Point 1 is associated with Controller 1 and that Access Point 2 is associated with Controller 2. An L2 over UDP data tunnel is created between the access points and the controllers. This means that whenever an access point receives data from a client it will forward this data packet inside the L2 over UDP tunnel to its associated controller only. In this example, Client 1 is associated with Access point 1 and all its data packets are sent to Controller 1 (only). Since the Client 1 has the gateway MAC A and IP A, this routes the data to Controller 1 that supports that gateway. Controller 1 will route the request and answer accordingly.

However, if Client 1 has never connected to the network, it has no home controller associated to it. In this example, Client 1 may first associate itself with Access Point 2. Since Access Point 2 is associated with Controller 2, the Client 1 traffic will now go through Access Point 2 and be then tunnelled to Controller 2. However, the gateway for Client 1 may be manually set to IP A or may be set by the DHCP server to IP A. When Client 1 attempts to talk to its gateway IP A, Controller 2 receives the Address Resolution Protocol (ARP) packet and could attempt to send it to Controller 1. However, Controller 1 may be inoperative and should not receive traffic from clients that it is not assigned to. To resolve this issue, Controller 2 examines at the ARP packet coming from the data tunnel. Controller 2 recognizes that the ARP packet contains IP A, but nevertheless treats this ARP packet as if it was meant for itself and responds to the client using the MAC address of Controller 1. This means that wireless clients will always get the same MAC address for the same IP, no matter on which controller they are associated.

In conclusion, a minimally synchronized controller hierarchy allows clients to move within the network without breaking connections, reauthenticating, or rebuilding session data. In one example, the minimally synchronized controller hierarchy includes a master controller with one or more slave controllers. The master controller serves as a central repository for an association table that assigns each client to a home controller. As a client moves between access points controlled by different controllers, the client's data is transparently forwarded back to the home controller. Consequently, the client has freedom to move within the area served by the network without undesirable disruptions. The illustrative systems and methods do not rely on complex synchronization schemes to distribute authentication and session data throughout the network.

The preceding description has been presented only to illustrate and describe examples of the principles described. This description is not intended to be exhaustive or to limit these principles to any precise form disclosed. Many modifications and variations are possible in light of the above teaching.

What is claimed is:

1. A method for minimal synchronized network operations comprising:
    making an initial connection between a client and a network, the initial connection being made through a first access point managed by a first controller acting as a home controller, the home controller recording session information and authentication data for the client; and
    making a subsequent connection between the client and the network through a second access point managed by a second controller, the subsequent connection being made without communicating the session information and authentication data between the home controller and the second controller, without client reauthentication, and without disrupting existing communication.

2. The method of claim 1, in which making the initial connection between the client and the network comprises:
    the client requesting a connection with the network through the first access point;
    the first access point sending an association request to a first controller; the first controller receiving the association request and sending the association request to a master controller.

3. The method of claim 2, in which the association request sent to the master controller comprises a client identifier and a first controller identifier.

4. The method of claim 3, further comprising checking, by the master controller, the client identifier against an association table to determine if the client is a new client or an existing client.

5. The method of claim 4, further comprising, if the client is a new client:
    entering the client identifier in the association table in the master controller;
    designating a first controller as the home controller for the client; and
    allowing the client to make a connection through the access point and home controller to the network.

6. The method of claim 4, further comprising, if the client is a new client:
    assessing a number of clients assigned to each of the available controllers on the network;
    assigning a controller with a least number of clients as the home controller for the client; and
    allowing the client to make a connection through the access point and home controller to the network.

7. The method of claim 5, in which the assignment of a home controller to the client is permanent for the duration of the client's connection to the network.

8. The method of claim 1, in which making the subsequent connection between the client and the network through the second access point comprises:
    sending an association request including the client identifier and a second controller identifier to a master controller;
    checking the client identifier against an association table;
    determining that the client is an existing client; and
    directing the second controller to pass data traffic related to the client to the home controller.

9. The method of claim 8, further comprising checking a heartbeat table to verify that the home controller is operational prior to directing the second controller to pass data traffic related to the client to the home controller.

10. The method of claim 8, in which directing the second controller to pass data traffic related to the client to the home controller comprises:
    substituting the second controller identifier with a home controller identifier to form an association notice; and
    sending the association notice to the second controller.

11. The method of claim 8, in which directing the second controller to pass data traffic related to the client to the home controller comprises:
    creating a tunnel between the second controller and the home controller; and
    forwarding communication between the client and the network through the home controller.

12. A network system comprising:
    a home controller for managing a first access point and for maintaining authentication and session data for a client assigned to the home controller;
    a second controller for managing a second access point, the client being connected to the network through the second access point;
    a communication path between the home controller and the second controller for forwarding data traffic between the client and the network through the home controller,
    in which the network system is configured to switch a client connection from the first access point to the second access point without synchronization of the authentication data between the home controller and the second controller,
    wherein the home controller:
        determines if a number of entries in a number of tables list a non-home controller as the home controller, and
        clears the entries in the tables representing the client.

13. The system of claim 12, in which the network system is further configured to switch a client connection from the first access point to the second access point without reauthentication and without synchronization of the session data between the home controller and the second controller.

14. A master access point controller comprising:
    a wired connection port for connecting the master access point controller to a network, a plurality of wireless access points being connected to the network, each of the plurality of wireless access point being managed by one of a plurality of slave access point controllers;
    a memory for storing data structures;
    a first data structure stored in the memory, the first data structure comprising a client identifier and a controller identifier that uniquely assigns a client to access the network through a home controller throughout the duration of connection of the client to the network, wherein the master access point controller and plurality of slave access point controllers do not synchronize session and authentication data such that the master access point controller and plurality of slave access point controllers do not maintain uniform data with respect to access points, users, session data, and authentication.

15. The controller of claim 14, further comprising an association request received by the master access point controller and stored in the memory, the association request comprising a client identifier and a requesting access point controller identifier.

16. The controller of claim 15, further comprising a processor for searching the first data structure for the client MAC address to determine if the client is a new client or an existing client, for assigning new clients a home controller, and for entering the new client's MAC address and home controller MAC address in the first data structure.

17. The controller of claim 14, further comprising an association notice generated by the master controller, the association notice comprising instructions for the client's network communication to be forwarded through the home controller.

18. The controller of claim 14, further comprising a team member table stored in the memory, the team member table comprising an IP address and MAC address of each of the access point controllers.

19. The controller of claim 14, further comprising a heartbeat table stored in the memory, the heartbeat table comprising a controller identifier for each of the plurality of access point controllers and the operational status of each of the plurality of access point controllers.

20. The controller of claim 19, in which the processor is configured to access the heartbeat table to ascertain the operational status of an access point controller prior to assigning the access point controller as a "home" controller for a client.

* * * * *